Jan. 6, 1959
S. I. TOURSHOU ET AL
2,867,751
SIGNAL PROCESSING CIRCUITS
Filed Nov. 14, 1952
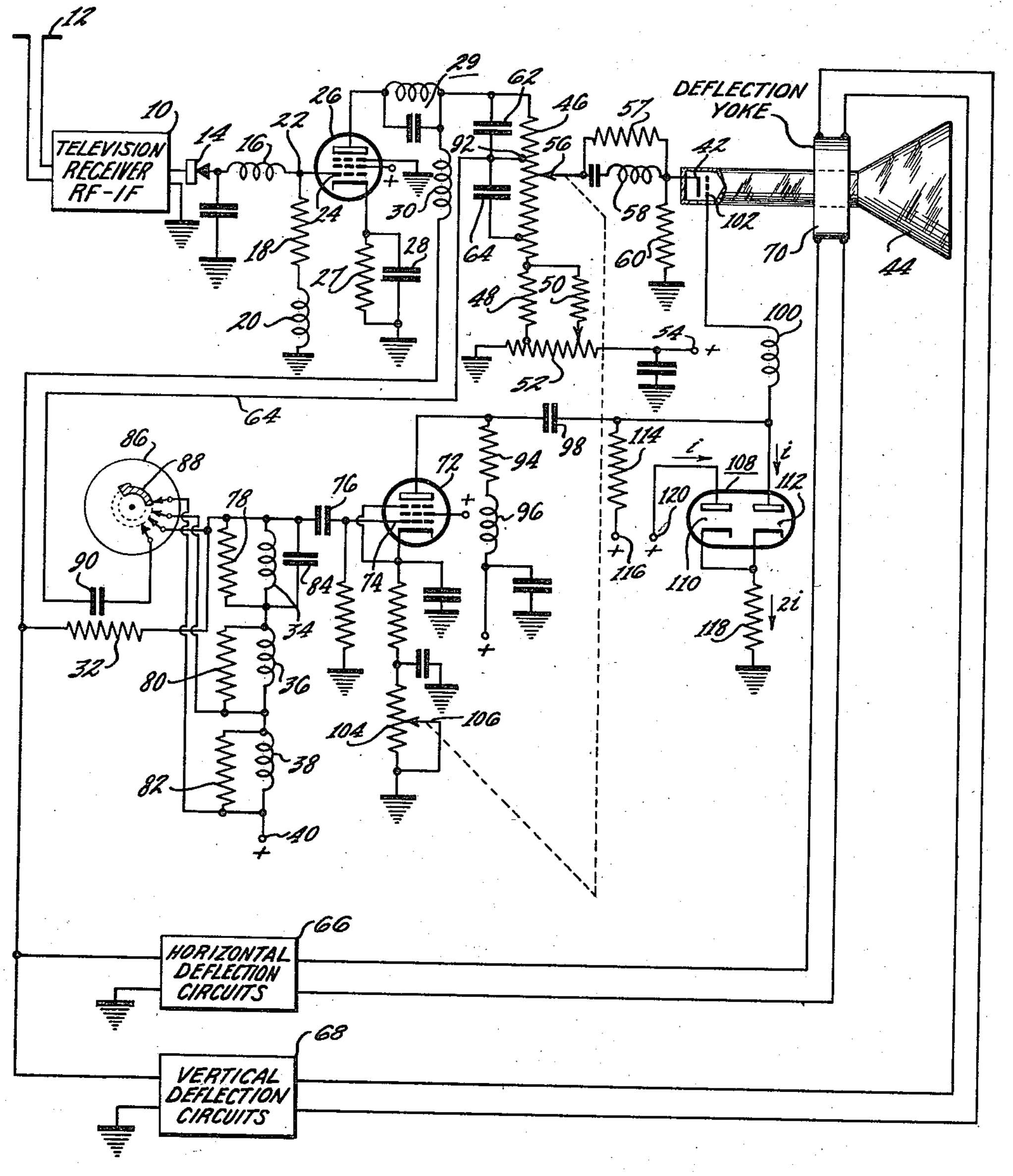
INVENTOR.
Simeon I. Tourshou,
Edwin B. Smith &
Gordon E. Skorup
BY [signature]
ATTORNEY United States Patent Office 2,867,751

Patented Jan. 6, 1959

2,867,751

SIGNAL PROCESSING CIRCUITS

Simeon I. Tourshou, Philadelphia, Pa., and Edwin B. Smith, Collingswood, and Gordon E. Skorup, Westmont, N. J., assignors to Radio Corporation of America, a corporation of Delaware Application November 14, 1952, Serial No. 320,544

6 Claims. (Cl. 315—30)

The present invention relates to improvements in signal processing arrangements particularly of the type in which the balance between various frequency components in a given electrical signal is to be controlled.

In more particularity, although not necessarily exclusively, the present invention relates to improvements in television video signal amplifiers in which means are provided for altering the relative balance between high and low frequency response in such a way as to effect control over the appearance of the television picture produced from signals delivered by the amplifier.

As the television art has progressed, increasing emphasis has been placed upon the desirability of producing larger pictures with no decrease in apparent definition. It is well known that the smaller the reproduced television picture the less system definition is necessary to produce a picture of acceptable appearance. However, as the reproducing picture tube size increases, strenuous demands are placed upon television receiving circuit design, in order that the resulting larger area picture have the visual quality equivalent to a picture produced on a smaller area tube. Since television transmission bandwidth restrictions limit theoretical picture definition the problem of producing fully acceptable television pictures as tube size and picture area increases becomes greater.

In accord with the above, there have been developed numerous circuits whose purpose has been to provide manual control over the appearance of a reproduced television picture by means of high frequency peaking. In this technique the high frequency end of the video signal spectrum is boosted somewhat so that the apparent rise time of transients in the signal, which represent front and back edges of partially defined objects is increased. Thus, without actually increasing the video bandwidth, the apparent definition or picture clarity is improved. However, the peaking technique for improving television picture appearance can be carried to the extent where picture quality is degraded due to ringing effects, phase distortion and the increased sharpness and emphasis imposed on random circuit noise disturbances. Such noise is sometimes generated in the television camera itself and as such, is known as "background agitation." Other noise may be atmospheric in nature or inherently arise in the television receiving circuit. Moreover, noise bursts appear more objectionable in over-compensated or over-peaked video circuits due to what is known as "overshoot" in the transient response of the amplifier, which causes the noise to produce "explosions" and gives an overall bass relief appearance in the picture.

It is, therefore, an object of the present invention to provide an improved frequency response control arrangement applicable to signal amplifiers of the type useful in the amplification of wide band signals, particularly of the television signal variety.

It is further object of the present invention to provide an improved definition control for television receiving circuits which overcomes many of the disadvantages and problems set forth above, whereby to improve the overall quality of large picture tube reproductions of television program material.

It is still another object of the present invention to provide a video signal amplifying arrangement which permits the accentuation of transient responses within the television signal without noticeably increasing the evidence of low amplitude noise content in the video signal.

In the realization of the above objects and features of advantage, the present invention contemplates the provision of a dual channel signal amplifying arrangement comprising primary and secondary amplifier channels with a common input circuit and combining means for mixing the output signals from each channel. The primary amplifier channel may be provided with ideal phase and amplitude response while the parallel channel is made particularly responsive to the higher frequency components of the common input signal. Threshold means are also provided in the secondary channel whereby only signals above a predetermined amplitude are passed by the secondary channel.

In the application of the present invention to television video signal amplifying systems, the secondary amplifier may be further provided with special gamma characteristics giving moderate gain of signal voltages only slightly above background noise level in the white direction while providing higher gain for voltages corresponding to blacks.

A more complete understanding of the present invention as well as a fuller appreciation of its objects and features of advantage will be obtained from a reading of the following specification, especially when taken in connection with the accompanying signal figure of the drawings which is a combination block diagram and schematic representation of one form of television receiving circuit embodying the present invention.

Turning now to the single figure of the drawings there is indicated by the block 10 receiver R. F. and I. F. amplifiers and superheterodyne signal processing circuits for receiving television modulated radio carriers. Television carrier signals are intercepted by the antenna 12 and applied to the input circuit of the receiving circuits 10. The output signals from the last intermediate frequency amplifier within the block 10 is then applied to a detector element 14 which is connected with load circuit elements 16, 18 and 20 for demodulating the received television signal. Demodulated signal appearing at terminal 22 is conveyed to the control electrode 24 of a video amplifier tube 26. The cathode of the amplifier tube 26 is connected with ground through a typical cathode biasing resistor 27. Capacitor 28 acts as a typical by-pass means for reducing degeneration in the cathode circuit of the amplifier. The anode load circuit for the video amplifier 26 comprises the series combination of peaking network 29, inductance 30, resistance 32 and supplementary peaking inductors 34, 36, and 38, the latter of which is connected to a positive power supply terminal 40. Signals to be conveyed in a normal fashion to the cathode 42 of the kinescope 44 are extracted from the upper terminal of the peaking inductor 30 and applied to a contrast control potentiometer 46. The potentiometer 46 has its lower extremity connected to a positive potential. This is accomplished by connecting the lower extremities of the resistances 48 and 50 to points along the bleeder resistor 52, which has its right hand extremity connected with a positive power supply terminal 54. By moving the arm 56 on the potentiometer 46 various signal levels may be conveyed to the cathode 42, by means of resistor 57 and inductance 58. The value of resistor 57 as well as the cathode to ground resistor 60 is adjusted in relation to the value of potentiometer 46 and resistors 48 and 50 to form a type of bridge balancing network such that the D.-C. potential at the potentiometer arm 56 is made virtually independent of its position along the potentiometer 46 for black level signal conditions. Thus, the potentiometer 46 may be accurately thought of as a contrast control. Such a system is described in United States patent application, by Bethel E. Denton, filed March 30, 1951, Serial No. 218,310, entitled High Level Contrast Control for Video Amplifiers.

Capacitors 62 and 64 act in a well known manner to equalize the frequency response characteristics of the potentiometer contrast control such to provide an overall frequency response which is relatively independent of the position of the arm 56 along the potentiometer resistance. Inasmuch as resistor 32 constitutes the major load impedance of the video amplifier 26, video signals may be extracted from the left hand terminal of the resistor 32 and applied to horizontal and vertical deflection circuits 66 and 68 for control thereof. Deflection signals developed by the horizontal and vertical deflection circuits are conventionally applied to the deflection winding of a deflection yoke 70, embracing the neck of kinescope 44.

The circuitry thus far described with the exception of the multiple peaking network 36, 38 and 40 represents prior art techniques and forms nothing more than one type of video amplifying system to which the present invention may be advantageously applied.

In accordance with the present invention a secondary video amplifier 72 is provided which is provided with only the higher frequency components of the demodulated television signal. To accomplish this, the secondary amplifier tube 72 has its control electrode 74 coupled by a capacitor 76 to the upper extremity of peaking inductance 34. In this fashion, only those signals of sufficient frequency to develop an appreciable voltage across the inductors 34, 36 and 38 will be applied to the amplifier 72. By properly adjusting the values of shunting resistors 78, 80 and 82 as well as the value of capacitor 84, the frequency response characteristic of the series peaking networks based upon inductors 34, 36 and 38 may be flattened to embrace the upper frequency portion of the video spectrum occupied by the received video signal.

In one embodiment of the invention the characteristics of the series peaking network configuration may extend over a range of three to four megacycles. Switching means 86 is provided so that the peaking sections 38, 36 and 34 may be successively shorted out by the clockwise rotation of the switch element 88. It is apparent that each successive step of the switch 86 will reduce the relative amplitude of high frequency components applied to the input circuit of the amplifier 72. In further accordance with the present invention, the switch element 88 may be further rotated clockwise to its last position, at which position capacitor 90 is connected from the tap 92 on contrast control potentiometer 46 to the power supply terminal 40. This last position will actually produce a reduction in the high frequency response of the primary video amplifier channel.

In further accordance with the particular form of the present invention illustrated, the output signal of the secondary video amplifier 72, developed across load resistor 94 and peaking inductance 96, is capacitively coupled by a capacitor 98 and series peaking inductance 100 to the control electrode 102 of kinescope 44. In order to provide means for varying the ratio of high frequency components to low frequency components in the reproduced television scene, hence picture sharpness, a secondary channel gain control means is provided such as is shown at 104. As picture contrast is changed the gain of the secondary amplifier stage 72 may be altered by means of the variable degeneration provided by the variable resistor 104. The arm 106 on variable resistance 104, shown in rheostat form, may be mechanically ganged with the arm 56 of contrast control potentiometer 46. Thus, as the contrast of the television scene is increased the signal delivered by the secondary amplifier 72 is increased to maintain a given degree of picture sharpness.

In order to overcome the prior art problems of increasing picture background agitation and noise effects as a result of accentuating the high frequency response of the video amplifier, the present invention provides a gating means 108 which acts as a threshold device in shunt with the load impedance 94 of the secondary video amplifier 72. The threshold device gating means 108 may comprise two diodes 110 and 112. Resistance 114 is then connected from a source of positive power supply potential having a terminal 116 to the anode of diode 112. The cathode of diode 112 is connected through resistance 118 to ground potential as is also the cathode of diode 110. The anode of diode 110 is coupled directly to a source of positive power supply potential 120. It will readily be seen that by adjusting the value of resistances 114 and 118 and the values of potentials 116 and 120, both diodes 110 and 112 may be made to conduct for low amplitude signals. When both diodes are conducting it will be seen that a very low shunt path exists across load resistor 94 and hence virtually no signal output will be delivered by the secondary amplifier channel. As soon as the value of signal developed across the anode of the diode 112 becomes sufficiently great, however, one or the other of the diodes will open due to the condition of zero or negative anode-cathode potential. This will immediately increase the impedance of the shunt path to a value determined by resistance 118 and high frequency video signal will be allowed to pass to the control electrode 102 of kinescope 44.

With such an arrangement and by proper adjustment of operating values for the threshold circuit 108, it will be seen that low amplitude noise such as picture background noise and the like will be prevented from appearing in its peaked form on the kinescope 44. However, higher amplitude values of video signal corresponding to picture information will cause the threshold device 108 to open and this information will be reproduced on the kinescope so as to add sharpness to the picture.

It is further contemplated in the present invention to adjust the screen voltage and bias of secondary amplifier 72 such that negative pulses appearing on the control electrode 74 produce only a moderate output signal level in the anode circuit of the amplifier, while positive pulses on the control electrode 72 will produce large voltage excursions in the output circuit. In this way overshoots or ringing produced by the peaking circuits 34, 36 and 38 which extend in the white direction will not be as noticeable in the kinescope 44 as in prior art arrangements.

Through the action of the present invention, as described hereinabove, it may be seen that the switch 86 may be operated as a definition control for the television receiver. That is to say, whenever a signal applied to the television receiver is of sufficient strength so as to minimize atmospheric noise and other types of interference the definition control switch 86 may be left in its counterclockwise position (as illustrated) to provide maximum peaking and high definition resolution in the reproduced picture. However, if atmospheric noise and interference becomes greater, the switch element of switch 86 may be rotated clockwise to arrive at a suitable lesser degree of high frequency peaking. As discussed hereinabove, if signal conditions are extremely poor, such that an objectionable amount of noise appears as snow throughout the scene, switch element 88 of switch 86 may be positioned at its extreme clockwise limit thereby imposing a loss in the high frequency response in the main video amplifier by means of bypass capacitor 90.

In its broadest form, it will be appreciated that the present invention is in no way limited to the specific embodiments shown. For example, the peaking elements 34, 36 and 38 although for purposes of economy and convenience are located in the anode circuit of the main video amplifier 26, may form a part of another video amplifier substantially in shunt with amplifier 26. By considering such an arrangement, it will be appreciated that the present invention in essence contemplates the provision of two separate video signal processing channels functionally connected in parallel with one another, either one of said channels being responsive only to the high frequency components of the video signal. Threshold means are then provided for conditionally deactivating the secondary channel for signals under a predetermined amplitude. This dual channel concept will be more easily visualized in connection with the illustrated embodiment through the realization that load resistor 32 of the primary video amplifier 26 virtually isolates the peaking circuits 34, 36 and 38 from the signal channel feeding the cathode 42 of kinescope 44. Thus peaking effects produced by the peaking circuits 34, 36 and 38 are effective only for secondary video amplifier 72.

What is claimed is:

1. In a video signal amplifying system, the combination of: an input terminal designated to receive a video signal having high and low frequency components; a video amplifier having an input and output circuit; said video amplifier having a band-pass characteristic sufficiently broad to embrace at least a majority of the signal frequency components in said video signal; signal coupling means connected between said video signal input terminal and the input circuit of said video amplifier; a high frequency accentuating circuit coupled with said video signal input terminal for developing an output signal representing only the higher frequency components of said video signal; a second video signal amplifier having an input circuit and an output circuit; signal coupling means connected from said high frequency accentuating circuit to the input circuit of said second video amplifier for applying only high frequency video signal components thereto; an amplitude responsive gating circuit connected with the output circuit of said second video amplifier for restricting output signals from said second video amplifier to signals having amplitude levels above a predetermined minimum, and a single video signal responsive utilization means coupled with the output circuits of said first and second video amplifiers.

2. Apparatus according to claim 1 wherein mechanically operated gain control means are incorporated in said first and said second video amplifiers and wherein said mechanically operated gain control means are mechanically coupled for unitary mechanical operation, such to provide a predetermined balance between high and low frequency components delivered to said video signal utilization means.

3. Apparatus according to claim 2 wherein said high frequency signal accentuating circuit is made variable in response characteristics and is provided with switching means for controlling said characteristics and wherein there is additionally provided high frequency loss means connected with said switch and said first video amplifier for conditionally imposing said high frequency loss means on said first video amplifier.

4. In a video signal amplifying system, the combination of: a first electron discharge tube having at least an anode, cathode and control electrode means coupled with said first electron discharge tube for applying video signal thereto; a load circuit for said first electron discharge tube, said load circuit comprising a plurality of serially connected inductances; an electron ray picture reproducing tube having at least two input terminals, a variable voltage divider circuit connected from a first point on said first video amplifier load circuit near the anode of the electron discharge tube therein to one input terminal of said picture reproducing tube; a second video amplifier having an input and output circuit; signal coupling means connected between the input circuit of said second video amplifier and a second point on said load circuit more remote from said first video amplifier electron discharge tube anode than said first point; a first and second serially connected diodes connected in shunt with said second video amplifier output circuit, said first and second diodes being so biased as to provide a shunt load on said second video amplifier output circuit only for signal levels below a predetermined minimum and a signal coupling means connected from said signal amplifying output circuit to the said second signal input terminal of said picture reproducing tube.

5. Apparatus according to claim 4 wherein said variable voltage divider circuit is mechanically operated and wherein there is additionally provided in said second video amplifier a mechanically operated gain control means; mechanical coupling between said variable loss means and said mechanically operated gain control means so arranged as to maintain a balance between high and low frequency components supplied to said picture tube substantially constant over a wide range of signal amplitudes applied to said kinescope.

6. In a television signalling system, a high frequency peaking means for peaking the high frequency components in a television signal to improve the apparent sharpness of television pictures reproduced from said television signal, the combination of: a source of alternating current television signals occupying a relatively wide band of signal frequencies; a signal reproducing means for transducing said television signal into a television picture such that relatively white information is produced by signal excursions on one side of the television signal axis and relatively black information is produced by signal excursions on the other side of said television signal axis; a high frequency accentuation circuit operatively coupled between said signal source and said reproducing means, said accentuation circuit including elements producing electrical ringing components in the signal delivered by said accentuation circuit, said ringing component predominantly extending in a given polarity direction with respect to the axis of said television signal; video amplifier means operatively interposed between the output of said accentuation circuit and said signal reproducing means, said amplifier means including means amplifying intelligence signal excursions opposite to said given polarity direction of said ringing component to a greater extent than signal excursions corresponding to said given polarity direction.

References Cited in the file of this patent

UNITED STATES PATENTS

| | | |
|---|---|---|
| 2,243,599 | Herbst | May 27, 1941 |
| 2,254,855 | Poch | Sept. 2, 1941 |
| 2,263,376 | Blumlein | Nov. 18, 1941 |
| 2,266,445 | Siegert et al. | Dec. 16, 1941 |
| 2,273,163 | Wilson | Feb. 17, 1942 |
| 2,299,875 | Bedford | Oct. 27, 1942 |
| 2,564,554 | Anderson | Aug. 14, 1951 |
| 2,636,939 | Wissel et al. | Aug. 28, 1953 |
| 2,654,028 | Levy | Sept. 29, 1953 |
| 2,740,071 | Goldmark | Mar. 27, 1956 |